Dec. 12, 1950     W. J. URBAN     2,534,187
SPROCKET WHEEL AND TOOTH THEREFOR
Filed Feb. 8, 1947
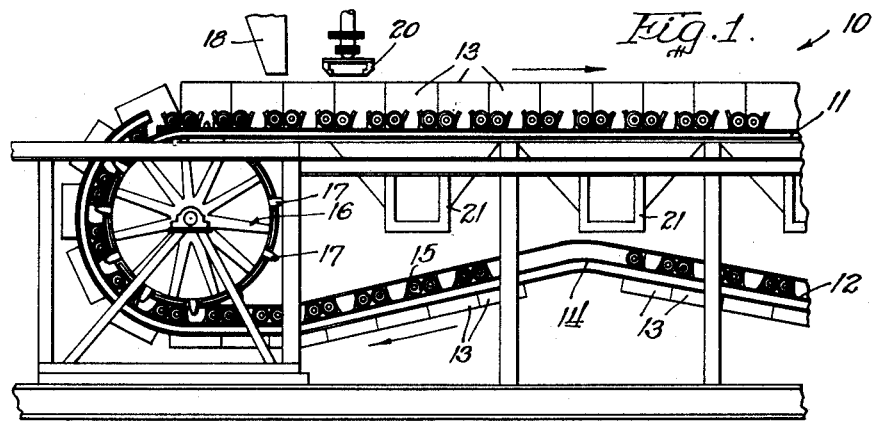
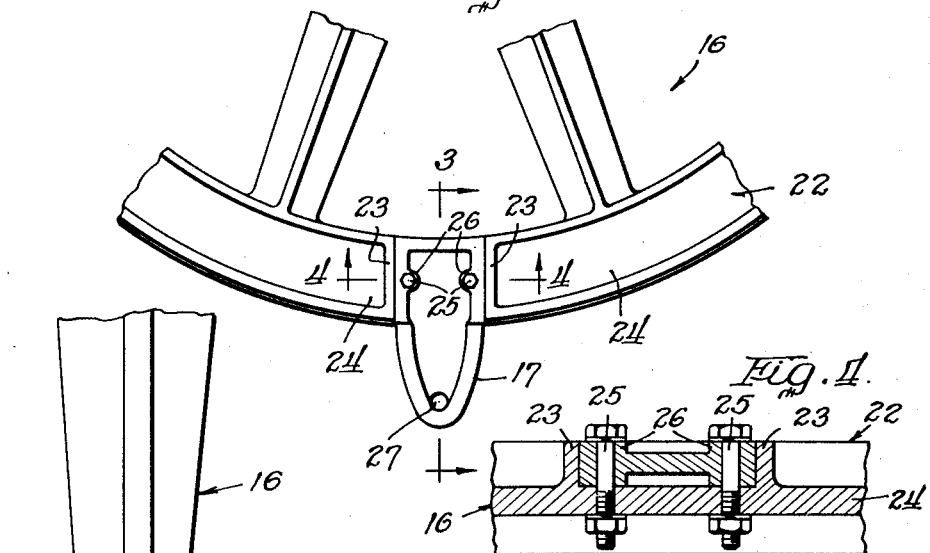
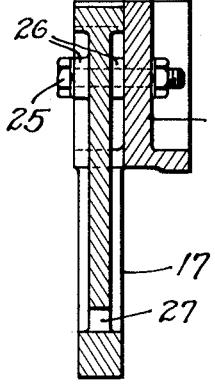
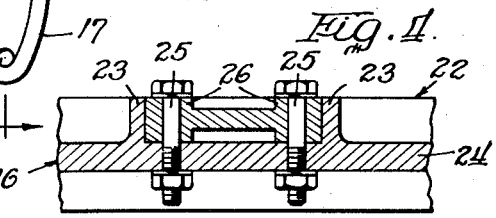
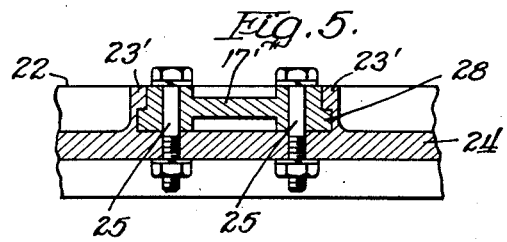
Inventor:
William J. Urban.
By Brown, Jackson, Boettcher + Dienner
Attys.

Patented Dec. 12, 1950

2,534,187

UNITED STATES PATENT OFFICE 2,534,187

SPROCKET WHEEL AND TOOTH THEREFOR

William J. Urban, Glen Ellyn, Ill., assignor to American Ore Reclamation Company, Chicago, Ill., a corporation of New York Application February 8, 1947, Serial No. 727,331

3 Claims. (Cl. 74—243)

1

This invention relates, generally, to large-sized sprocket wheels of the type adapted for use in elevating pallets at the return bend of a Dwight & Lloyd sintering machine. The invention has particularly relation to such sprocket wheels wherein the projecting teeth are removable, and are secured to the rim of each wheel by means of shear bolts.

Continuous type sintering machines, such as those of the Dwight & Lloyd type, are now well known in the art. In such machines, a train of pallets travel along an endless track having upper and lower runs with return bends at opposite ends. The pallets pass down one return end from the upper run to the lower run under the force of gravity. At the opposite (feed) end it is usual to provide a pair of sprocket wheels secured to the opposite ends of a shaft and so arranged that the projecting teeth of the sprocket wheels serve to elevate the pallets from the lower run to the upper run.

When a sintering machine is operating properly, the teeth on the sprocket wheels enter into spaces provided therefor between the wheels or rollers on the sides of the pallets and engage against bearing surfaces whereby each pallet is propelled and elevated around the return end of the machine so as to place it at the beginning of the upper or feed run. The machine is so designed that each successive tooth on a sprocket wheel engages the next pallet in line and elevates it to the upper run in the same manner. It sometimes happens that as the leading pallet on the return or lower track comes under the sprocket wheels for elevation, it is so positioned that it is not properly aligned for engagement by the sprocket teeth. When this happens the sprocket teeth strike the pallet at some intermediate point of the frame, usually with the result that either the pallet or the sprocket wheel is broken, or the machine is otherwise damaged. In any event, the machine will have to be temporarily shut down for repairs thus stopping production and involving considerable loss in time.

The object of the present invention is to provide the sprocket wheels with removable teeth which are secured thereto by means of shear bolts, or the equivalent, so that when a tooth strikes against a pallet frame the bolts will shear off, thereby preventing breakage of either the pallet, tooth or sprocket wheel.

Another object of the invention is the provision of sprocket wheels of the type described which are provided with removable teeth so that as one side of a tooth becomes worn in use, the

2 tooth can be reversed so as to wear the opposite side.

Still another object of the invention is the provision of a sprocket wheel of the type described wherein the removable teeth are secured in dove-tailed pockets on the rim of the wheel so as to prevent a tooth from falling off the wheel when the shear bolt by which it is secured is sheared off.

Other objects of the invention will, in part, be obvious and will in part appear hereinafter.

For a more complete understanding of the nature and scope of this invention, reference may now be had to the following detailed description of the two presently preferred embodiments thereof, taken in connection with the accompanying drawings, wherein:

Figure 1 is a diagrammatic, side elevational view of the feed end of a continuous type sintering machine of the Dwight & Lloyd type, provided with sprocket wheels for elevating the pallets, which sprocket wheels have projecting teeth secured thereto in accordance with the present invention;

Figure 2 is a fragmentary, side elevational view of a portion of a sprocket wheel having a removable tooth secured thereto and illustrating one preferred embodiment of the invention;

Figure 3 is an enlarged sectional view taken on line 3—3 of Figure 2;

Figure 4 is an enlarged sectional view taken on line 4—4 of Figure 2; and

Figure 5 is a sectional view corresponding to Figure 4 but showing a modification wherein the removable tooth and the receiving pocket therefor on the wheel rim are dove-tailed in shape.

Referring first to Figure 1 of the drawings, the feed end of a continuous type sintering machine, such as the Dwight & Lloyd type of sintering machine, is indicated generally at 10. In accordance with the usual construction, a track 11 is provided which serves as the upper run of the machine, while a track 12 serves as the lower run.

A train of pallets 13 are moved along the upper track with the pallets 13 abutting against each other so as to provide a closed supporting area. After the pallets 13 have traversed the upper run from left to right, they are returned by way of the track 12 in an inverted position, as shown. The lower track 12 is provided with an upward bend at 14 so as to provide a decline 15 down which the inverted pallets 13 roll so as to be picked up by a pair of sprocket wheels 16 and returned to the upper run 11.

When the sintering machine 10 is working properly, the return pallets 13 will be fed down the incline 15 one after the other so that the teeth 17 on the sprocket wheels 16 will fit into a pocket between the rollers on each side of the pallets and lift the pallets around the return bend and onto the feed end of the upper run or track 11. The pallets 13 are filled from a feed hopper 18 and the contents are then ignited by the igniter 20. As the pallets 13 pass down the track 11, the suction boxes 21 draw air therethrough so as to bring about a sintering of the pallet contents.

Occasionally, trouble will develop so that the inverted pallets 13 do not properly feed down the decline 15 of the lower run 12. This difficulty is usually caused by sintered material falling on the track 12. However, it may be due to other reasons. In such instances, the teeth 17 do not properly interfit within the space provided between the front and back rollers on each side of the pallets 13, but instead will strike the frame of the pallet with resultant damage. As indicated above, the present invention is directed to an arrangement wherein the teeth 17 are secured to the wheel 16 by shear bolts, or their equivalent, so as to permit the teeth to yield when this trouble develops, thereby preventing breakage.

Reference may now be had to Figures 2 through 5 of the drawings for a more detailed description of the sprocket teeth 17 and the manner in which the same are secured to the rims 22 of the sprocket wheels 16. The sprocket wheels 16 are usually made in two castings which are suitably bolted together. One side of the rim of each wheel is provided with a number of equally spaced pockets so as to receive the lower or base portions of the teeth 17. Preferably, the pockets are located midway between the spokes of each wheel 16 and are formed by integral flanges 23 which are parallel with each other. Each pocket is open at opposite ends. The back or floor of each pocket is formed by the central web 24 of the rim 22.

Each tooth 17 sits fairly snugly between the sides 23 of each pocket and is secured to the rim 22 by a pair of shear bolts 25 which extend through bosses 26 formed on the teeth 17 and through the web 24 of the rim 22. The shear bolts 25 are preferably formed of soft iron, or equivalent metal, which is softer than either the teeth 17 or the rim 22.

It is desirable to provide an eye 27 through the projecting end of each tooth 17 so that it may receive a hook whereby each tooth may be easily recovered when it has been knocked out of place.

When a tooth 17 strikes improperly against a part of a pallet 13, the shear bolts 25 will shear off and allow the tooth 17 to be pushed inwardly through the pockets, thereby preventing breakage. The sintering machine can then be stopped and the trouble corrected without requiring any repair other than the replacement of the shear bolts 25.

Rivets could be used in place of the shear bolts 25. However, the bolts are more convenient for this purpose.

In Figure 5 of the drawing a modification is shown which serves to facilitate recovery of a tooth once it has been pushed out of place. As there shown, the integral flanges 23' forming the sides of the teeth receiving pockets are undercut so as to receive the projecting flanges 28 provided on the back sides of the teeth 17'. In this way, each tooth 17' interfits in a pocket in a dovetailed relationship. When the shear bolts 25 holding one of the modified teeth 17' are sheared off, the tooth can only be pushed inwardly towards the center of the wheel, but cannot fall off from it.

It will be noted that the teeth 17 (Figures 2, 3 and 4) are symmetrical so as to permit each tooth to be reversed on either of the pair of sprocket wheels 16, thereby making it possible to obtain full wear on both pallet engaging surfaces of each tooth. However, the modified teeth 17' (Figure 5) which are provided with retaining flanges 28 cannot be reversed on the same sprocket wheel 16. However, full wear of these teeth can be obtained of both contact surfaces by transferring one of them to the other sprocket wheel.

The particular shape of the pallet contacting surfaces of the teeth 17 and 17' forms the subject matter of my co-pending application Serial No. 723,619 filed Jan. 22, 1947.

Since certain further changes may be made in the foregoing embodiments of the invention, and different embodiments may be provided without departing therefrom, it is intended that all matter described above or shown in the accompanying drawings shall be interpreted as illustrative and not in a limiting sense.

I claim:

1. In a sprocket wheel of the character described, a rim having tooth receiving pockets opening radially outward thereof, sprocket teeth mounted in said pockets, and shear members restraining said teeth against movement inwardly of said pockets, said teeth being adapted for movement radially inwardly of said pockets upon failure of said shear members under pressure applied to the outer ends of said teeth and said pockets being unobstructed and open at their inner ends for such inward movement of said teeth responsive to failure of said shear members.

2. In a sprocket wheel of the character described, a rim having tooth receiving pockets provided with side flanges and opening radially outward of said rim, sprocket teeth mounted in said pockets between said flanges thereof, and shear bolts securing said teeth to said rim, said teeth being otherwise free for movement radially inward of said pockets and the latter being unobstructed at their radially inner ends for inward movement of said teeth upon failure of said bolts under pressure applied to the outer ends of said teeth.

3. In a sprocket wheel of the character described, a rim having tooth receiving pockets provided with undercut side flanges and opening radially outward of said rim, sprocket teeth mounted in said pockets provided with elements having interfitting frictional engagement with said flanges, said pockets being open at their radially inner ends for inward movement of said teeth, and shear bolts securing said teeth to said rim.

WILLIAM J. URBAN.

REFERENCES CITED

The following references are of record in the file of this patent:

UNITED STATES PATENTS

| Number | Name | Date |
| --- | --- | --- |
| 605,443 | Cooper | June 7, 1898 |
| 1,630,313 | Rorabeck | May 31, 1927 |
| 1,921,329 | Smoot | Aug. 8, 1933 |